United States Patent [19]

Katsuta et al.

[11] 3,845,501

[45] Oct. 29, 1974

[54] VIDEO RECORDING AND/OR REPRODUCING APPARATUS HAVING AN AUTOMATIC TAPE THREADING MECHANISM

[75] Inventors: Takashi Katsuta; Masataka Hattori; Masao Inaba; Minao Iwamoto; Takashi Suzuki, all of Tokyo, Japan

[73] Assignee: Nippon Electric Company, Limited, Tokyo, Japan

[22] Filed: Jan. 29, 1973

[21] Appl. No.: 327,781

[30] Foreign Application Priority Data

Feb. 4, 1972 Japan ............................... 47-13014
Nov. 13, 1972 Japan ............................... 47-114170

[52] U.S. Cl. ............................... 360/85, 360/95
[51] Int. Cl.... G11b 23/04, G11b 15/66, G11b 5/52
[58] Field of Search ............ 179/100.2 ZA, 100.2 Z, 179/100.2 T; 274/4 D, 4 E; 226/91

[56] References Cited

UNITED STATES PATENTS 3,678,213 7/1972 Sato .......................... 179/100.2 ZA
3,681,539 8/1972 Eibensteiner ............. 179/100.2 ZA
3,688,059 8/1972 Miura et al. ............... 179/100.2 ZA
3,721,776 3/1973 Inaga ......................... 179/100.2 ZA
3,740,492 6/1973 Inaga ......................... 179/100.2 ZA
3,740,495 6/1973 Kihara ....................... 179/100.2 ZA

*Primary Examiner*—Alfred H. Eddleman
*Attorney, Agent, or Firm*—John M. Calimafde

[57] ABSTRACT

Video recording and/or reproducing apparatus in which a magnetic tape is scanned at a slant angle with respect to the tape transportation direction by at least one rotary magnetic head rotated in the vicinity of a clearance gap at a tape guide drum. The magnetic tape contained in the tape cassette or cartridge is automatically threaded and unthreaded about and from the tape guide drum by a moving pinch roller or an idler mounted on a loading arm rotated around the guide drum.

8 Claims, 6 Drawing Figures

VIDEO RECORDING AND/OR REPRODUCING APPARATUS HAVING AN AUTOMATIC TAPE THREADING MECHANISM

BACKGROUND OF THE INVENTION

This invention relates to video recording and/or reproducing apparatus such as a helical scan video tape recorder (VTR), wherein magnetic tape contained in a tape cassette or cartridge is automatically threaded about a tape guide drum.

In magnetic recording and/or reproducing apparatus such as a helical scan VTR, a magnetic tape is threaded in a slanted manner about a tape guide drum and scanned by at least one rotary magnetic head rotated in the vicinity of a clearance gap of the guide drum to form video tracks slanted with respect to the longitudinal direction of the tape. In conventional VTR's, the threading of the tape about the guide drum is complicated and difficult to accomplish.

In order to facilitate the threading procedure, there have been proposed various types of automatic threading systems for VTR's such as the cassette VTR and the cartridge VTR, in which the magnetic tape contained in the tape cassette or cartridge must be automatically threaded about the guide drum. Those proposed systems employ complicated mechanisms which are very costly to manufacture, and which are characterized by relatively low reliability.

It is therefore an object of this invention to provide an improved automatic tape-threading helical scan VTR with a simplified tape-threading mechanism.

SUMMARY OF THE INVENTION

According to the principles of invention, there is provided an improved helical scanning video recording and/or reproducing system in which a magnetic tape contained in a tape cassette or cartridge is automatically and helically threaded about a tape guide drum by a moving pinch-roller or idler mounted on a loading arm helically rotated around the tape guide drum.

BRIEF DESCRIPTION OF THE DRAWINGS

The above-noted features and advantages of the present invention will be understood from the following detailed description of a preferred embodiment of this invention, taken in conjunction with the accompanying drawings, wherein.

DESCRIPTION OF INVENTION

Figure 1:
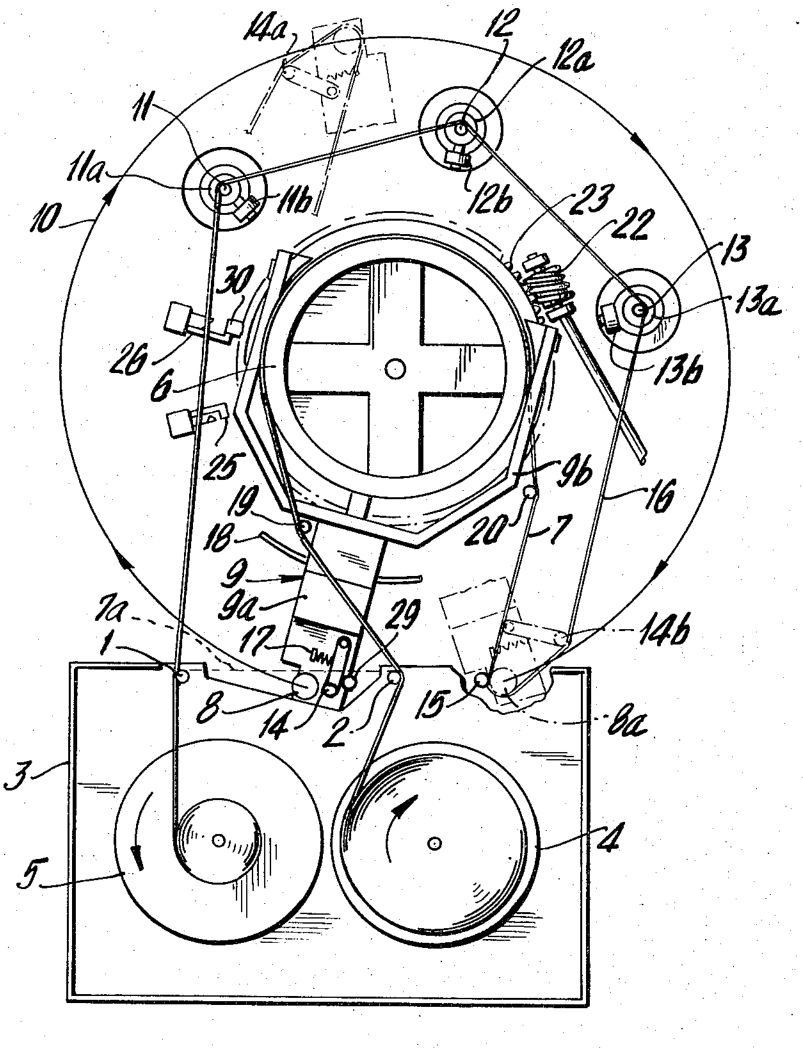
FIG. 1 is a plan view of an embodiment of this invention.
Figure 2:
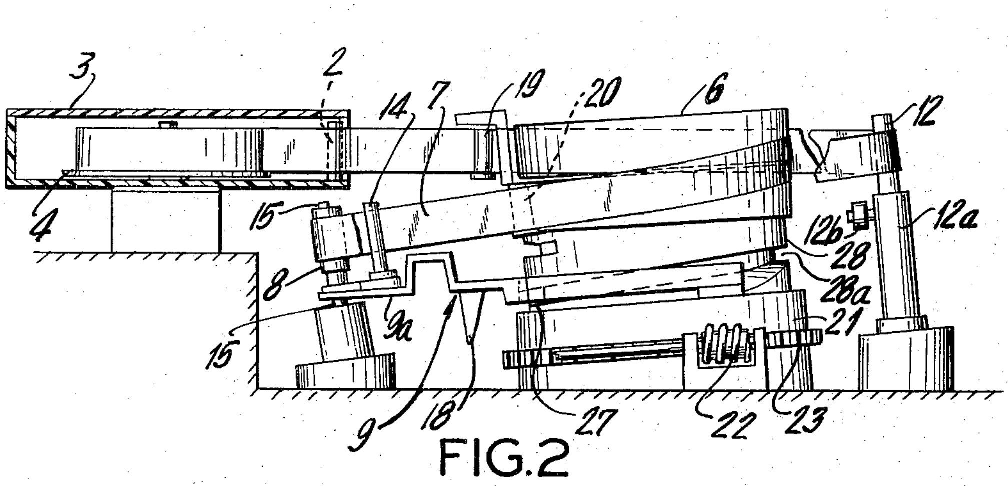
FIG. 2 is a side view of the embodiment shown in FIG. 1.
Figure 3:
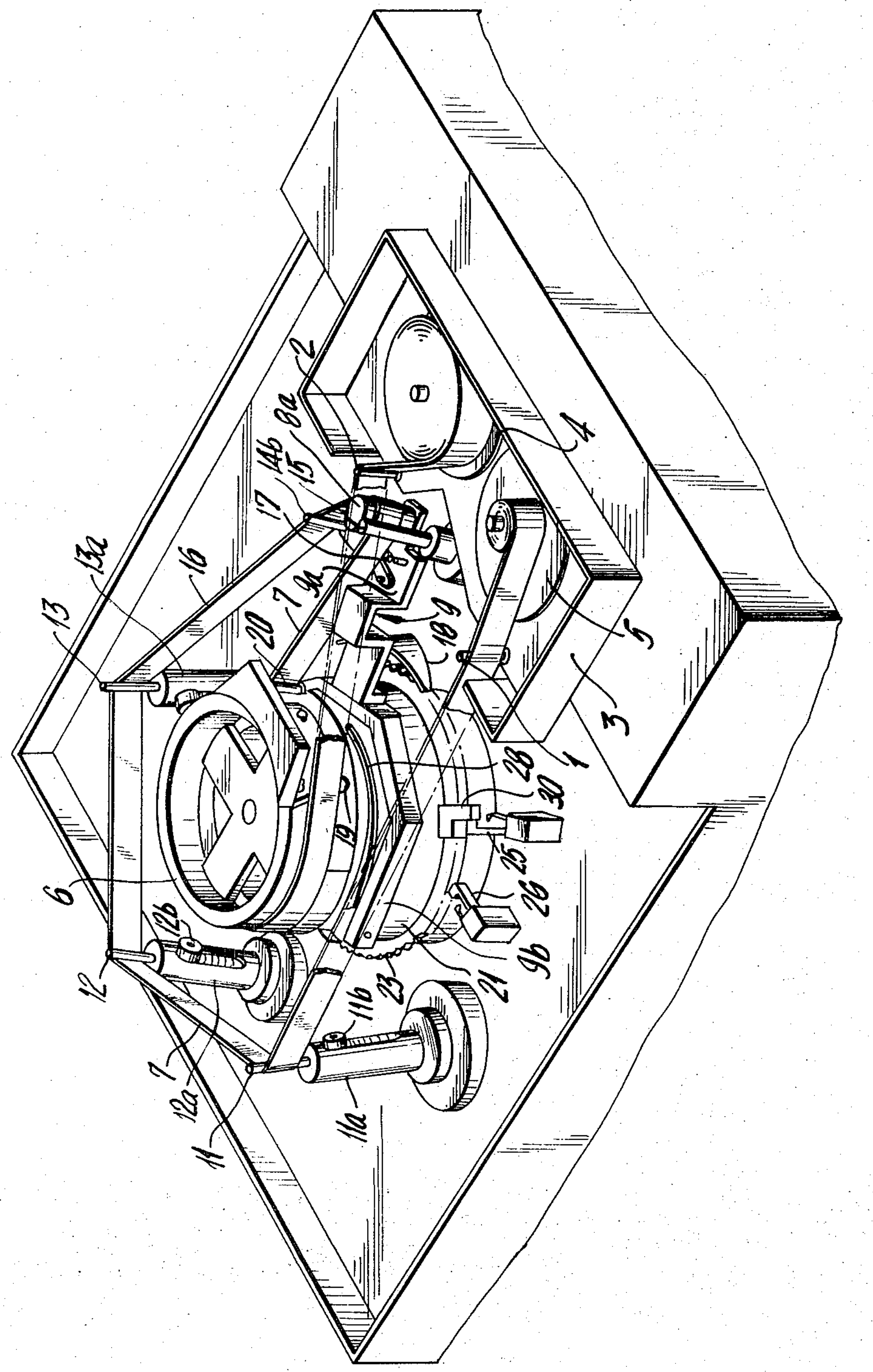
FIG. 3 is a perspective view of the embodiment shown in FIG. 1.

Referring to FIGS. 1, 2 and 3, a tape cassette 3 is first loaded onto the video tape recorder for recording and-/or reproducing. The tape cassette 3 has a magnetic tape 7, a supply reel 4, a take-up reel 5 and guide poles 1 and 2. Before the threading, the magnetic tape 7 is directed from the guide pole 2 to the pole 1 as shown by a dotted line 7*a*.

A loading arm 9 having a radially projecting arm portion 9*a* with a moving pinch-roller 8 mounted on its tip is rotably mounted about an axis common to that of a tape guide drum 6 so that pinch-roller 8 may be allowed to move around the tape guide arm 6. When not in its operative state, the pinch-roller 8 resides at a home or quiescent rest position disposed inside (with respect to the cassette 3) the dotted line 7*a* along which the magnetic tape 7 is led preparatory to the threading.

When the cassette is inserted with the tape lying at the dotted line 7a, the loading arm 9 is automatically caused to move around the guide drum 6 so that the pinch-roller 8 mounted at its end portion travels along a circular path shown by a solid line in a direction of an arrow 10. Since the tape section disposed along the dotted path 7*a* is pulled throughout this circular motion of the pinch-roller 8, the magnetic tape 7 is continuously withdrawn from the tape cassette 3 and threaded about the guide drum 6. While the pinch-roller 8 is effecting its circular motion, the magnetic tape 7 successively comes in contact with return pins 11, 12 and 13 as shown, which are arranged to move up and down with respect to the plane of the sheet of the drawing. The loading arm 9 keeps moving until the pinch-roller 8 comes in contact with a capstan 15. Thus, the magnetic tape 7 is automatically threaded about the guide drum 6, with a return path 16 for the tape 7 being provided at the same time as shown.

Together with the pinch-roller 8, a movable pin 14 is mounted on the arm portion 9a of the loading arm 9. As the loading arm 9 starts its above-considered rotation, the movable pin 14 which has been pressed against a stopper pin 29 by a spring member 17 is released to protrude from the arm portion 9a forming a definite angle therewith. Thus, the magnetic tape 7, when guided to the outside of the return pins, is maintained apart at both sides of the pinch-roller with a sufficiently wide spacing to permit upward motion of the return pins 11, 12 and 13 during the period when the two sections of the magnetic tape are disposed on both sides thereof.

Figure 5:
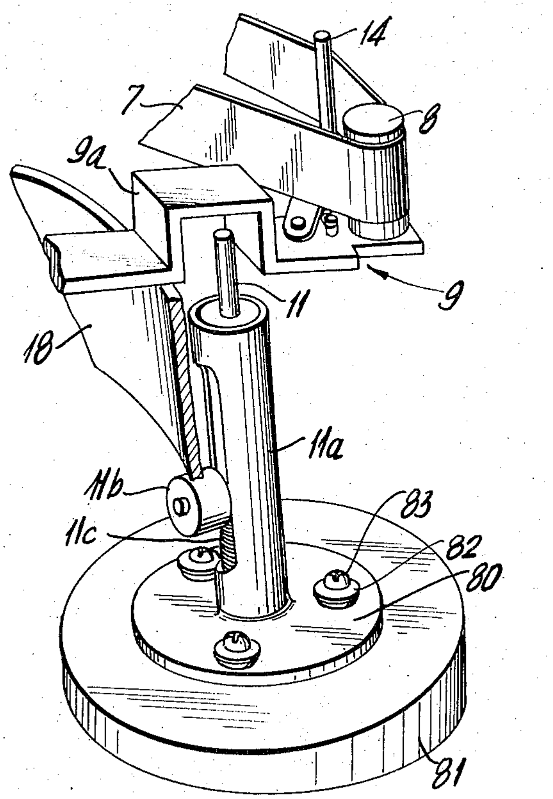
FIG. 5 is a perspective, partly sectional view of the tape guide return pin of the embodiment shown in FIG. 1.

A bilge-shaped pin-lifting cam 18 is provided on the lower portion of the loading arm 9 as shown in FIGS. 2 and 5, for moving the return pins 11, 12 and 13 up and down to avoid any collision or interference between the loading arm 9 and these return pins. The return pins 11, 12 and 13 are lowered by the cam 18, and then raised by springs 11*c*, 12*c* and 13*c* (see FIG. 5), respectively, as the loading arm 9 passes thereby. Thus, the above-described tape threading progresses automatically and smoothly.

As shown in detail in FIG. 5, the return pin 11 is mounted on a support member 11*a*, and driven at return roller-follower 11b by the slope of the lifting cam 18. The coil spring 11*c* is provided for biasing the return pin 11 upward. The return pins 12 and 13 are identical in construction to the return pin 11. Such operation of the lifting cam 18 and the return pins 11, 12 and 13 requires a minimum of space, and provides a simplified mechanism for loading the tape onto the return pins 11, 12 and 13.

Figure 6:
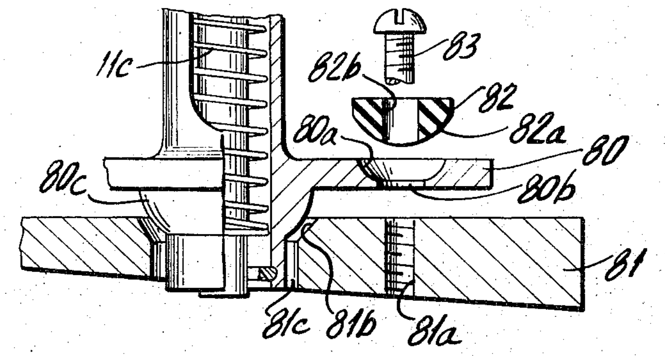
FIG. 6 is a cross sectional view of the return pin shown in FIG. 5.

In a helical scan VTR, the magnetic tape 7 should be threaded about the guide drum 6 in a slanted manner. The inclination of the magnetic tape 7 shoulder therefore be compensated for in the tape return path. For this purpose, the return pins 11, 12 and 13 are slightly obliquely mounted on a horizontal base plate as shown in FIGS. 2, 5 and 6. A flange 80 of the return pin support 11*a* is installed on a table seat 81 which has a tappered bottom and is installed on the base plate. The table seat 81 has three screw holes 81*a* and a hole 81*c* having an inclined portion 81*b*. The flange 80 has three sperical-like holes 80*a*, three holes 80*b* greater in diameter than that of the screw hole 81*a*, and a spherical portion 80*c*. Because three screws 83 are inserted into the screw holes 81*a* through holes 82*b* of spherical washers 82 each having a spherical portion 82*a* identical in radius of curvature to the spherical hole 80*a*, the spherical portion 80 *c* of the flange 80 is in contact with the inclined portion 81*b*. Under this condition, the inclination angle of the return pin 11 to the base plate is suitably set by adjusting three secrews 83. Thus, the desired inclination angle is attained, i.e., that which most suitably implements the compensating inclination of the tape return path.

Figure 4:
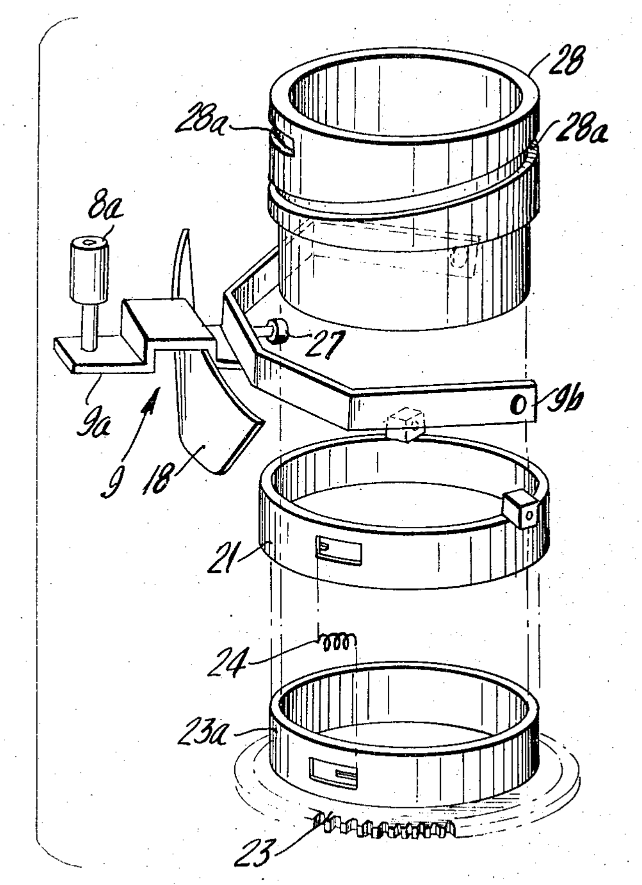
FIG. 4 is an exploded view of one essential portion of the embodiment shown in FIG. 1.

As shown in FIG. 4, a root (radially inner) portion 9*b* of the loading arm 9 is supported on a loading arm support member 21 installed on the outside of a cylindrical portion 23*a* of an annular gear wheel 23. The loading arm support member 21 is engaged with the cylindrical portion of the gear wheel 23 by a spring member 24, whereby the loading arm support member 21 rotates as the gear wheel 23 is rotated. The gear wheel 23 is driven by a driving gear 22. Thus, the loading arm 9 is rotated as well.

A cylinder 28 having a helical groove 28*a* is disposed above the loading arm support member 21, and fixed on the base plate through the cylinder portion 23*a* of the gear wheel 23. A roller 27 mounted on the loading arm 9 is inserted in the helical groove 28*a*. Therefore, the arm portion 9*a* of the loading arm 9 moves up and down when it rotates, i.e., the arm portion 9*a* of the loading arm 9 helically rotates about the cylinder 28. As a result, the pinch-roller 8 mounted on the arm portion 9*a* is helically rotated about the guide drum 6 mounted on the cylinder 28, whereby the magnetic tape 7 is automatically and helically threaded about the guide drum 6. Thus, the magnetic tape 7 is ready and in a position for slant scanning by a rotary magnetic head along its longitudinal direction.

It is observed that the rotary head may be mounted on an upper guide drum rather than in the guide drum 6, with the guide drum divided into an upper rotary and a lower stationary drum portions.

The rotation of the loading arm 9 and the loading arm support member 21 is stopped when the pinch-roller 8*a* comes in contact with the capstan 15. However, the gear wheel 23 engaged with the loading arm support member 21 by the spring 24 allows a little further rotation until a stopper lever 30 mounted on the gear wheel 23 comes in contact with a first stopper 25 which controls the power switch of a driving motor of a gear 22, whereby the spring 24 is compressed. Accordingly, the loading arm support member 21 and the loading arm 9 supported thereon are pressed by the spring 24, thus causing the capstan 15 to be pressed by the pinch-roller 8. This pressure between the pinch-roller 8 and the capstan 15 persists after the power source is connected from the driving motor for the gear 22. This is achieved by suitably selecting the structure or the angles of the gears 22 and 23 (for instance, by using worm gears).

The magnetic tape 7 automatically threaded about the guide drum 6 is driven at a predetermined speed by the capstan and the pinch-roller 15 and 8 from the supply reel 4 to the take-up reel 5 through the guide poles 2 and 19, the guide drum 6, a guide pole 20, the capstan and the pinch-roller 15 and 8, the guide pin 14, the return pins 13, 12 and 11, and the guide pin 1. The take-up reel 5 is rotated in a direction of the arrow by a driving source such as a reel motor (not shown). The supply reel 4 gives the back tension to the magnetic tape as in conventional prior art arrangements.

When the cassette is to be removed, the magnetic tape 7 is readily unthreaded through a process inverse in order from that for the tape-threading. More specifically, the loading arm 9 is rotated in the direction opposite to that of the arrow 10. The magnetic tape 7 in contact with the return pins 13, 12 and 11 is released therefrom through the cooperative interaction of the pin-actuating cam 18 and these return pins as was the case during the tape-threading. When the stopper lever 30 comes in contact with a second stopper 26 to bring the pinch-roller 8 to the quiescent home position between the guide poles 1 and 2, the stopper 26 functions to switch-off the power source for the driving source of the gear 22. The moving pin 14 is also closed by the stopper pin 29. During tape unthreading, at least one of the reels 4 and 5 is kept in operation so that the magnetic tape 7 is rewound thereto to avoid tape loosening.

As clearly described above, in the video recording and/or reproducing apparatus according to this invention, the moving pinch-roller or idler serves not only as a part of a tape driving means but also as a tape extracting mechanism.

The above-described arrangement is merely illustrative of the principles of the present invention. Numerous modifications and adaptations thereof will be readily apparent to those skilled in the art without departing from the spirit and scope of the present invention.

What is claimed is:

1. Video recording and/or reproducing apparatus in which a magnetic tape is helically scanned by at least one rotary magnetic head, comprising;

means for housing said magnetic tape, said housing means having two tape reels disposed substantially side by side;

tape guiding means for guiding said magnetic tape along the periphery thereof, said tape guiding means having a clearance gap with respect to the rotating magnetic head for permitting the rotary magnetic head to be rotated in the vicinity thereof, said tape guiding means further having a substantially helical groove disposed on the outer surface thereof;

loading arm means including a follower roller disposed for travel within said groove, said loading arm means thereby moving in a substantially helical path around said tape guiding means;

said loading arms means extracting said magnetic tape from said tape housing means and threading said magnetic tape about said tape guiding means during the helical movement thereof;

driving means for rotating said loading arm means about said tape guiding means to dispose said magnetic tape on said tape guiding means;

means for transporting said magnetic tape in a longitudinal direction; and roller means disposed on said loading arm means at a distance radially outward from the surface of said tape guiding means and for engaging said magnetic tape with said transporting means.

2. A combination as in claim 1, further comprising retractable biased tape positioning means disposed in proximate relation to the path of travel of said roller means on said arm means, cam surface means on said arm means, and follower means for selectively retracting said biased retractable positioning means responsive to said cam surface means to obviate interference between said tape and said tape positioning means.

3. A combination as in claim 4, wherein said positioning means is canted with respect to said guide means.

4. A combination as in claim 1, further comprising limit means for selectively deactivating said arm means driving means.

5. A combination as in claim 1, wherein said guide means is cylindrical in form, and said driving means comprises a gear wheel, and spring means coupling said gear wheel to said arm means.

6. A combination as in claim 1, further comprising tape driving capstan means, said roller means on said arm means being selectively located contiguous to and in pressure engagement therewith under action of said driving means.

7. A combination as in claim 1, further comprising rotary magnetic head means for scanning said tape.

8. A combination as in claim 7, wherein said rotary head means is disposed within said guide means.

* * * * *

UNITED STATES PATENT OFFICE

CERTIFICATE OF CORRECTION

Patent No. 3,845,501 Dated October 29, 1974

Inventor(s) Takashi Katsuta; Masataka Hattori; Masao Inaba et al

It is certified that error appears in the above-identified patent and that said Letters Patent are hereby corrected as shown below:

Column 5, claim 3, line 18, "claim 4" should be --claim 2--.

Signed and sealed this 7th day of January 1975.

(SEAL)
Attest:

McCOY M. GIBSON JR.
Attesting Officer

C. MARSHALL DANN
Commissioner of Patents

FORM PO-1050 (10-69)